US012572549B2

(12) United States Patent
Chou et al.

(10) Patent No.: US 12,572,549 B2
(45) Date of Patent: Mar. 10, 2026

(54) SYSTEMS AND METHODS FOR OBJECT DESIGN

(71) Applicant: NORTHROP GRUMMAN SYSTEMS CORPORATION, Falls Church, VA (US)

(72) Inventors: Sibo Chou, Melbourne, FL (US); Daniel W. Plawecki, Melbourne, FL (US); Aline R. Rodrigues, Melbourne, FL (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 1207 days.

(21) Appl. No.: 17/371,325

(22) Filed: Jul. 9, 2021

(65) Prior Publication Data

US 2023/0008324 A1      Jan. 12, 2023

(51) Int. Cl.
| | |
|---|---|
| *G06F 16/2457* | (2019.01) |
| *G06F 16/23* | (2019.01) |
| *G06F 30/15* | (2020.01) |
| *G06F 111/20* | (2020.01) |

(52) U.S. Cl.
CPC ........ *G06F 16/24578* (2019.01); *G06F 16/23* (2019.01); *G06F 30/15* (2020.01); *G06F 2111/20* (2020.01)

(58) Field of Classification Search
CPC ..... G06F 30/15; G06F 16/23; G06F 16/24578
See application file for complete search history.

(56) References Cited

U.S. PATENT DOCUMENTS 10,168,998 B2      1/2019   Shack et al.

FOREIGN PATENT DOCUMENTS

| | | |
|---|---|---|
| JP | 62208171 A | 9/1987 |
| JP | 2004178222 A | 6/2004 |
| JP | 2005276126 | 10/2005 |

(Continued)

OTHER PUBLICATIONS

Ghiasian, S. E., & Lewis, K. (Aug. 2020). A machine learning-based design recommender system for additive manufacturing. In International design engineering technical conferences . . . (vol. 84003, p. V11AT11A025). American Society of Mechanical Engineers. (Year: 2020).*

(Continued)

*Primary Examiner* — Bijan Mapar
(74) *Attorney, Agent, or Firm* — KATTEN MUCHIN ROSENMAN LLP

(57) ABSTRACT

In some examples, design parameter data for an object can be received based on user input. A set of design criteria for the object can be received based on the design parameter data. A search of a learned design virtual reality (VR) database can be implemented to identify a set of candidate designs for the object based on the set of design criteria. The learned design VR database can include a plurality of previously determined designs for the object. Each candidate design for the object can be simulated in a simulation environment based on a learned design simulation database and optimization criteria to identify at least one new design for the object. A ranked design list can be generated ranking each candidate design and the at least one new design for the object based on ranking criteria.

18 Claims, 4 Drawing Sheets

(56) References Cited

FOREIGN PATENT DOCUMENTS

| JP | 2005276126 | A | * | 10/2005 |
| JP | 2006146766 | | | 6/2006 |

OTHER PUBLICATIONS

Guo, Z., Zhou, D., Zhou, Q., Zhang, X., Geng, J., Zeng, S., . . . & Hao, A. (2020). Applications of virtual reality in maintenance during the industrial product lifecycle: A systematic review. Journal of Manufacturing Systems, 56, 525-538.) (Year: 2020).*
Shiasian Seyedeh Elaheh et al: "A Machine Learning-Based Design Recommender System for Additive Manufacturing", Proceedings of the ASME 2020 International Design Engineering Technical Conferences & Computers and Information in Engineering Conference IDETC/CIE Aug. 16-19, 2020, 2020, St. Louis, Missouri, USA, Jun. 1, 2020 (Jun. 1, 2020), XP055963255, Retrieved from the Internet: URL:https://www.researchgate.net/publ.
Guo ZJ:Yue et al: "Applications of virtual reality in maintenance during the industrial product lifecycle: A systematic review", Journal of Manufacturjing Systems., vol. 56, Jul. 1, 2020 (Jul. 1, 2020), pp. 525-538, XP055963252, us U:SSN: 0278-6125, DOI: 10.1016/j.jmsy.2020.07.007 abstract p. 526, left-hand column, paragraph 3-right-hand column, paragraph 4 the whole document.
International Search Report for corresponding PCT/US2022/032058, mailed Sep. 29, 2022.
OA_Translation for corresponding JP 2023-579548 issued Dec. 17, 2024.

* cited by examiner

300

| RECEIVING DESIGN PARAMETER DATA | 302 |

| GENERATING A SET OF DESIGN CRITERIA FOR AN OBJECT BASE ON THE DESIGN PARAMETER DATA | 304 |

| IDENTIFYING A SET OF CANDIDATE DESIGNS FOR THE OBJECT BASED ON THE SET OF DESIGN CRITERIA | 306 |

| SIMULATING THE SET OF CANDIDATE DESIGNS TO IDENTIFY AT LEAST ONE NEW CANDIDATE DESIGN FOR THE OBJECT | 308 |

| GENERATING A RANKED DESIGN LIST | 310 |

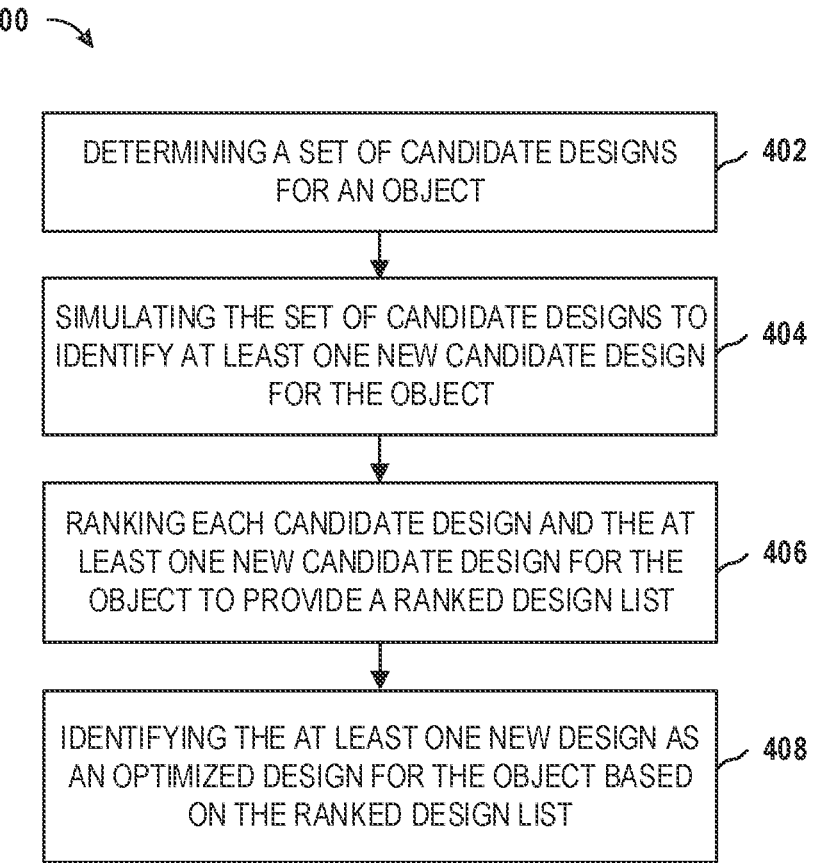

400

DETERMINING A SET OF CANDIDATE DESIGNS
FOR AN OBJECT — 402

SIMULATING THE SET OF CANDIDATE DESIGNS TO
IDENTIFY AT LEAST ONE NEW CANDIDATE DESIGN
FOR THE OBJECT — 404

RANKING EACH CANDIDATE DESIGN AND THE AT
LEAST ONE NEW CANDIDATE DESIGN FOR THE
OBJECT TO PROVIDE A RANKED DESIGN LIST — 406

IDENTIFYING THE AT LEAST ONE NEW DESIGN AS
AN OPTIMIZED DESIGN FOR THE OBJECT BASED
ON THE RANKED DESIGN LIST — 408

FIG. 4

SYSTEMS AND METHODS FOR OBJECT DESIGN

TECHNICAL FIELD

The present disclosure relates to systems and methods for object design.

BACKGROUND

An engineering design process is a series of steps that engineers or users can use in creating a product or process. The engineering design process may be iterative wherein parts of the process often need to be repeated many times before another can be entered; though the part(s) that get iterated and the number of such cycles in any given project may vary. It is a decision-making process in which the basic sciences, mathematics, and engineering sciences are applied to convert resources optimally to meet a stated objective. Among the fundamental elements of the design process are the establishment of objectives and criteria, synthesis, analysis, construction, testing, and evaluation. A design is a plan or specification for the construction of an object or system or the implementation of an activity or process, or the result of that plan or specification in the form of a prototype, product, or process. Design requirements can control a design of a product or process being developed through the engineering design process. The design requirements can include, as an example, functions, attributes, and specifications, which can be determined after assessing user needs. Some design requirements include hardware and software parameters, maintainability, availability, and testability of modifications, compliance with airworthiness directives, and repair.

SUMMARY

The present disclosure relates to systems and methods for object design.

In an example, a computer-implemented method can include receiving design parameter data for an object based on user input at an input device, generating a set of design criteria for the vehicle component based on the design parameter data, and searching a learned design virtual reality (VR) database to identify a set of candidate designs for the vehicle component based on the set of design criteria. The computer-implemented method can include simulating each candidate design for the object in a simulation environment based on a learned design simulation database and optimization criteria to identify at least one new design for the object and generating a ranked design list ranking each candidate design and the at least one new design for the object.

In another example, a system can include memory that can include machine readable instructions and data, and one or more processors to access the memory and execute the machine readable instructions. The machine readable instructions can include an object designer that can be programmed to determine a set of candidate designs for an object based on design parameter data and a learned design VR database. The learned design VR database can include a plurality of previously determined designs for the object. The machine readable instructions can include a design simulator engine that can be programmed to simulate each candidate design for the object in a simulation environment based on a learned design simulation database and optimization criteria. The learned design simulation database can characterize one or more previously simulated scenarios and associated design changes for one or more previously simulated designs for the object. The optimization criteria can be used to influence one or more design changes for at least some of the candidate designs of the set of candidate designs for the object during the simulation to identify the at least one new design for the object. The design simulator engine can be programmed to generate a ranked design list ranking each candidate design and the at least one new design for the object based on ranking criteria.

In yet another example, one or more non-transitory computer-readable media can have data and machine readable instructions that can be executable by a processor. The data can include a learned design VR database comprising a plurality of previously determined designs for the object, a learned design simulation database characterizes one or more previously simulated scenarios and associated design changes for one or more previously simulated designs for the object, and design parameter data for an object. The machine readable instructions can include an object designer that can be programmed to determine a set of candidate designs for the object based on the design parameter data and the learned design VR database, a design simulator engine that can be programmed to simulate each candidate design for the object in a simulation environment based on the learned design simulation database and optimization criteria to identify at least one new design for the object, and a ranking module that can be programmed to generate a ranked design list ranking each candidate design and the at least one new design for the object, The at least one new design in the ranked design list is identified as having a greatest ranking relative to the set of candidate designs in the ranked design list.

BRIEF DESCRIPTION OF THE DRAWINGS

FIG. 4 is another example of a method for determining a design for an object.

DETAILED DESCRIPTION

Figure 1:
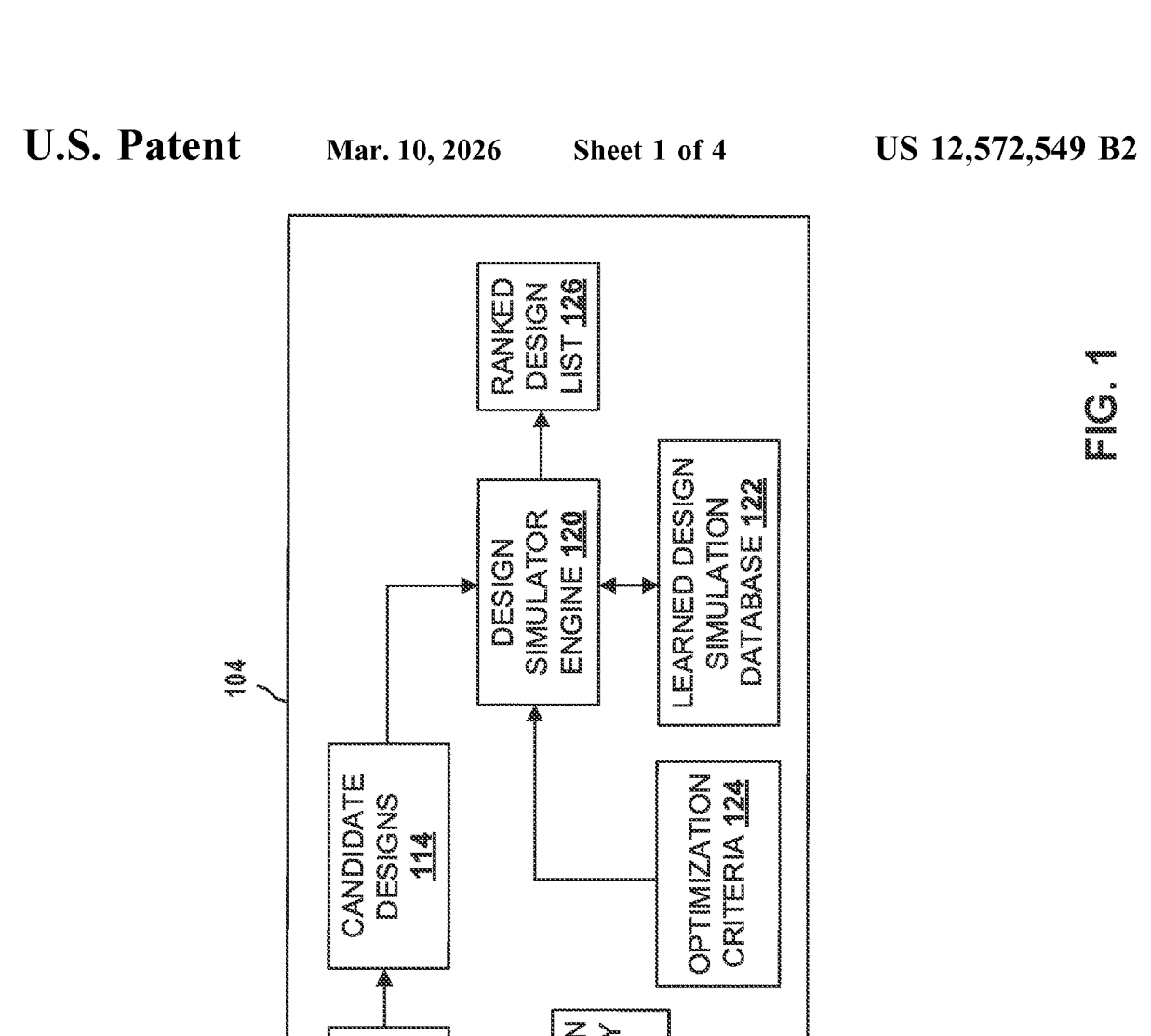
FIG. 1 is an example of object design optimization.

The present disclosure relates to systems and methods for object design. The term "object" as used herein can refer to a vehicle (e.g., an aerial, a ground, and/or a marine vehicle), a system (e.g., a missile guidance system), an electronic device, circuit, a machine, a part (e.g., a vehicle part), or a component (e.g., an air filter) of a system. Existing object design systems used for object design are limited to storing previous object designs in a database and searching the database for a (legacy) design (e.g., a previous design) based on user-defined design criteria. Thus, existing object design systems are limited to locating a legacy design in a database and fail to take into account new design criteria as specified by the user-defined design criteria and/or design constraints of previous designs, which in some instances only can be identified during use of the object design (e.g., during manufacturing, testing, and/or maintenance of the design).

In some instances, a design constraint of a previous design for the object is not known until the object based on a respective previous design is manufactured and deployed for use (e.g., in a vehicle). The design constraint of the previous design may not be communicated to a new designer (e.g., an engineer that did not work on the previous design) that is working on a new design for the object and thus the existing object design system may have no knowledge of the design constraint of the previous design. While the design constraint for the previous design may be stored in the documentation and/or in the object design system (e.g., as data or as part of a document), the new designer may not be aware of the design constraint proposed by the respective previous design and/or may find it difficult to locate the design constraint of the previous design.

By way of example, the previous design may be a previous design for an air filter for a vehicle, such as an aerial vehicle. The previous design may indicate that the air filter placed in a particular location on the vehicle makes it difficult to reach or carry out maintenance of the air filter (e.g., repair or replace). In some instances, the previous design for the air filter may require the disassembly of an engine of the vehicle to carry out air filter maintenance, however, engine disassembly exponentially increases an amount of time needed to complete maintenance of the air filter. As such, the location of the air filter is a maintenance design constraint for the previous design as maintenance of the air filter can be negatively impacted (e.g., increase the amount of time needed to complete maintenance).

Systems and methods are described for determining at least one optimized design for an object. The systems and methods described herein can determine the optimized design for the object based on prior learned object designs that meet (or comply with) design objectives provided by a user. According to the systems and methods described herein a more accurate design (referred to herein as the optimized design) can be determined for the object based on prior learned object design events identified in a VR object simulation system. Because the systems and methods described herein provide an optimized design, in some examples, the maintenance time and thus downtime (e.g., of a vehicle) can be reduced. Furthermore, the systems and methods described herein eliminate reliance on manual object design (e.g., human-based object design and refinement) since the optimized design for the object can be identified automatically based on the design objectives. The systems and methods described herein can take into account at least one design constraint of at least one previous design for the object to provide the optimized design for the object corresponding to a design that is free of the at least one design constraint associated with (or identified by) the at least one previous design. In some examples, the object can be manufactured according to the optimized design.

For example, an object design system as described herein can include an object designer. The object designer can determine a set of candidate designs for an object based on design parameter data and a learned design VR database. The learned design VR database can include a plurality of previously (e.g., legacy) determined designs for the object provided by (or determined using) a VR object simulation system. The design parameter data can specify or indicate design objectives (e.g., criteria, parameters, etc.) for the design, which in some instances, may be different from the design objectives of at least some of the previously determined designs for the object.

In some examples, a design simulator engine of the object design system can simulate each candidate design for the object in a simulation environment based on a learned design simulation database and optimization criteria. As an example, the simulation environment can be used to simulate object scenarios, such as a maintenance scenario for each candidate design. In further examples, the design simulator engine can modify or make design changes to each candidate design for the object for object simulation to identify at least one new design for the object.

The learned design simulation database can characterize one or more previously simulated scenarios (e.g., a previously simulated maintenance scenario) used for simulating one or more previously simulated designs, the one more previously simulated designs, and associated design changes for the one or more previously simulated designs for the object. The optimization criteria can be used to influence one or more design changes for at least some of the candidate designs of the set of candidate designs for the object during the simulation to identify the at least one new design for the object.

In some examples, the design simulator engine can generate a ranked design list ranking each candidate design and the at least one new design for the object based on ranking criteria. As an example, the ranking criteria may be object location criteria identifying a location on a vehicle which results in a least amount of time needed to carry out maintenance of the object when in use. A greatest ranked design for the object of the ranked design list may be referred to as the optimized design. In some examples, each ranked design of the ranked design list is a respective optimized design for the object. Accordingly, the object design system can determine at least one optimized for the object that is free of design constraints associated with legacy designs for the object. Many examples are described herein wherein the object is a vehicle part (e.g., an air filter) in a context of vehicle maintenance. However, the examples described herein should not be construed and/or limited to only vehicle parts and/or vehicle maintenance. For example, the systems and methods described herein can be used for optimization of a design for a circuit, a machine, etc.

FIG. 1 is an example 100 of object design optimization for an object 102. In the example of FIG. 1, an object design system 104 can be configured to identify (or provide) at least one optimized design for the object 102. By way of example, the object 102 may be a vehicle part (e.g., an air filter) for a vehicle (e.g., a ground, a marine, or an aerial vehicle). In some examples, a VR object simulation system 106 is configured to capture a motion of a user to control a motion (e.g., in some instances a full-body motion) of a graphical representation of a user rendered in a virtual environment (e.g., on a display). In some examples, the graphical representation of the user may be referred to as an "avatar" of the user. The VR object simulation system 106 can be configured to render a graphical representation of an object as a virtual object based on a design for the object in the virtual environment. The VR object simulation system 106 can be used by the user to simulate the use of the virtual object in a simulated environment (e.g., simulated maintenance of the respective object).

As an example, the virtual object may be representative of an air filter for a vehicle. The VR object simulation system 106 can be configured to receive design object data 108 characterizing a previous design for the object and employ the design object data 108 to generate the virtual object in the virtual environment. In some examples, the design object data 108 can include a computer-aided design (CAD) rendering of the object, or other types of mathematical models for generating the virtual object. In some examples, the VR object simulation system 106 can be configured to render a graphical representation of a vehicle (e.g., of an aerial vehicle) as a virtual vehicle in the virtual environment (e.g., to enable the user to simulate maintenance of the respective object based on the previous design).

The VR object simulation system 106 can enable the user to interact with the simulated object in the virtual environment. For example, the VR object simulation system 106 can be configured to enable the user to simulate installation, maintenance, (e.g., replacement or repair), or other use events (e.g., assembly) of the virtual object in the virtual environment. For example, the VR object simulation system 106 can be configured to capture the motions of the user as the user simulates the installation of the virtual object on the virtual vehicle in the virtual environment. To capture the motions of the user, in some examples, the user can wear a motion capture suit that one or more cameras of the VR object simulation system 106 can capture to move the avatar of the user in the virtual environment relative to the virtual vehicle based on the captured motions. In other examples, the user can simulate the replacement of an existing virtual object (e.g., an existing virtual filter) on the virtual vehicle with the virtual object.

In further examples, the VR object simulation system 106 can capture the motions of the user as the user simulates assembly of a virtual system (e.g., the virtual vehicle or a virtual system of the virtual vehicle, such as a virtual missile system) that includes the virtual object. In some examples, the VR object simulation system 106 can be configured to capture the motions of the user as the user simulates a disassembly of the virtual system to obtain or reach the virtual object. Thus, the VR object simulation system 106 can allow the user to explore the use or performance of different designs (e.g., different filter designs) for the object in the simulated environment. Because the user can simulate the use or performance of the virtual object in the virtual environment, the user can identify design constraints of the virtual object and thus for each respective previous design for the object. As an example, the design constraints can include tolerance constraints, defect constraints, orientation constraints, sizing constraints, installation constraints, repair constraints, maintenance constraints, assembly constraints, and/or other types of design constraints. The design constraints may be identified during the use of the object based on the design, such as when implementing maintenance of the object.

For example, the virtual object can be located (or installed) at a given virtual location on the virtual vehicle wherein access is restricted to the virtual object (e.g., the virtual object is positioned behind a virtual engine of the virtual vehicle). By simulating maintenance of the virtual object in the virtual environment using the VR object simulation system 106 can enable the user to determine that the given location of the virtual object is a maintenance constraint as maintenance of the virtual object would require disassembly of the virtual engine of the virtual vehicle. As such, the user can determine that a respective design for the object is not optimal and may increase maintenance time for the object based on the respective design. In some instances, the user can modify the respective design for the object based on the maintenance constraint identified during the simulation and re-run a maintenance simulation scenario to confirm whether the maintenance constraint has been reduced or eliminated.

In some examples, the VR object simulation system 106 can be configured to capture at least some of the design constraints of the virtual object identified during the virtual simulation, such as requesting or querying the user to provide design constraints as feedback data to the VR object simulation system 106. The design constraints may be provided as a part of VR testing data 110. In some examples, the VR object simulation system 106 can be configured to capture design preferences based on user input during the simulation. As an example, the design preferences can specify that it is preferred that the object is mounted at a lowest point on the aerial vehicle to prevent fuel spillage on other components during maintenance of the aerial vehicle. The design preferences may be provided as a part of the VR testing data 110.

In further examples, the VR object simulation system 106 can be configured to capture a motion of the user relative to the virtual object and/or virtual vehicle in the virtual environment, user timing data, and other information during the simulation. The VR object simulation system 106 can provide user motion data characterizing the captured motions, such as the user implementing one of an installation, assembly, and/or maintenance of the virtual object in the virtual environment. By way of further example, the user timing data can include maintenance time (e.g. indicating an amount of time that it took the user to simulate maintenance of the virtual object), an installation time (e.g., indicating an amount of time that it took the user to simulate an installation of the virtual object), and/or other timing information. The user timing and/or motion data may be provided as a part of the VR testing data 110. The VR testing data 110 can be used to provide an initial baseline for determining an optimized design for the object 102 as described herein.

In some examples, the object design system 104 can include an object designer 112. The object designer 112 can be configured to determine a set of candidate designs 114 for the object 102 based on design parameter data 116 and a learned design VR database 118. The learned design VR database 118 can include a plurality of previously determined designs for the object 102. The VR testing data 110 can be stored in the learned design VR database to provide the plurality of previously determined designs. Thus, the learned design VR database 118 can include the plurality of previously (e.g., legacy) determined designs for the object 102 provided by (or determined using) the VR object simulation system 106. The design parameter data 116 can specify or indicate design objectives (e.g., criteria, parameters, etc.) for the object 102, which in some instances, may be different from the design objectives of at least some of the previously determined designs for the object 102.

In some examples, the object design system 104 can include a design simulator engine 120. The design simulator engine 120 can be configured to simulate each candidate design of the candidate designs 114 for the object 102 in a simulation environment based on a learned design simulation database 122. As an example, the simulation environment can be used to simulate object scenarios, such as a maintenance scenario for each candidate design. In further examples, the design simulator engine 120 can be configured to modify or make design changes to at least one candidate design for the object 102 for respective object simulation to identify at least one new design for the object 102. The learned design simulation database 122 can characterize one or more previously simulated scenarios (e.g., a previously simulated maintenance scenario) used for simulating one or more previously simulated designs, the one more previously simulated designs, and associated design changes for the one or more previously simulated designs for the object 102.

In some examples, the design simulator engine 120 can be configured to simulate each candidate design of the candidate designs 114 for the object 102 in the simulation environment based on optimization criteria 124. The optimization criteria 124 can be used to influence one or more design changes for at least some of the candidate designs of the set of candidate designs 114 for the object 102 during the simulation to identify the at least one new design for the object 102. In some examples, the design simulator engine 120 can be configured to generate a ranked design list 126 ranking each candidate design and in some instances the at least one new design for the object 102 based on ranking criteria. As an example, the ranking criteria may be object location criteria identifying a location on a vehicle which results in a least amount of time needed to carry out maintenance of the object 102 when in use. In some examples, a greatest ranked design for the object 102 of the ranked design list 126 may be referred to as the optimized design. In other examples, each design of the ranked design list 126 may be a respective optimized design for the object 102.

Accordingly, the object design system 104 herein can provide the optimized design for the object 102 that is based on prior learned object designs (e.g., stored in the learned design VR database 118) that meets design objectives provided by the user (e.g., as part of the design parameter data 116). The optimized design for the object 102 provided by the object design system 104 can reduce maintenance time and thus downtime (e.g., of a vehicle) in contrast to a legacy design for the object being used. The object design system 104 can take into account at least one design constraint of at least one previous design for the object 102 to provide the optimized design for the object 102 corresponding to a design that is free of the at least one design constraint.

Figure 2:
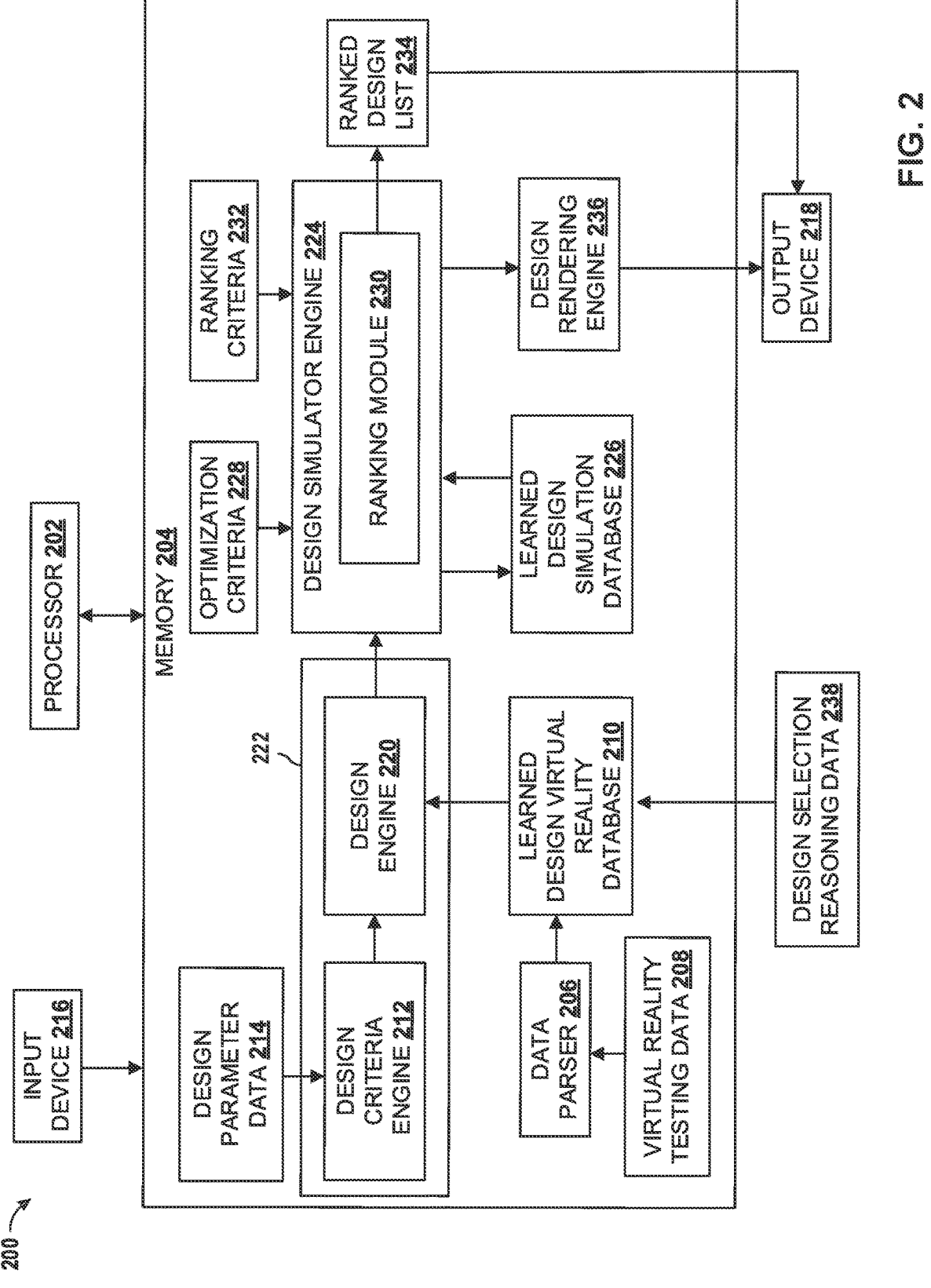
FIG. 2 is an example of an object design system.

FIG. 2 is an example of an object design system 200. The object design system 200 can correspond to the object design system 104, as shown in FIG. 1. Thus, in some examples, reference can be made to FIG. 1 in the following example of FIG. 2. The object design system 200 includes a processor 202 and memory 204. While the example in FIG. 2 illustrates a single processor and memory in other examples, a plurality of processors and memories can be used. By way of example, the processor 202 can be one or more processor cores. The memory 204 can be one of a hard disk drive, a solid-state drive, a flash memory, or the like. In the present example of FIG. 2, although the components of the object design system 200 are illustrated as being implemented on a similar system, in other examples, the components could be distributed across different systems (e.g., computers, devices, etc.) and communicate, for example, over a network (e.g., a wireless and/or wired network). The memory 204 can include machine readable instructions that can be representative of an optimized design application that can be executed by the processor 202 to identify at least one optimized design for an object, such as the object 102, as shown in FIG. 1.

For example, the memory 204 can include a data parser 206. The data parser 206 can be programmed to parse VR testing data 208. The VR testing data 208 can be provided by the VR object simulation system 106, as shown in FIG. 1. Thus, the VR testing data 208 can be the VR testing data 110, as shown in FIG. 1. In some examples, the data parser 206 can be programmed to receive the VR testing data 208 for each object design tested by the VR object simulation system 106. The data parser 206 can be programmed to parse the VR testing data 208 and provided parsed VR testing data for storage in a learned design VR object database 210. For example, the VR testing data 208 can be structured and parsed into an object name, dimensions, volume, function, mass, attachment points (e.g., location), etc. By way of further example, the data parser 206 can be programmed to parse the VR testing data 208 into data element classifications (e.g., Data Element 1=Object Name, Data Element 2=Object Volume, Data Element 3=Object Dimensions, etc.), which can be provided to the learned design VR object database 210.

The learned design VR object database 210 can store learned (or taught) events characterized by the parsed VR testing data for each object design tested in the VR object simulation system 106. Thus, the learned design VR object database 210 can identify a plurality of previous designs for one or more objects that have been determined using the VR object simulation system 106. Each design of the plurality of previous designs for the object can be associated (e.g., logically linked) in the learned design VR object database 210 with design attributes. The design attributes can include the design constraints, the design preferences, the user timing data, and/or the user motion data determined during a respective design simulation using the VR object simulation system. Because the plurality of previous designs for the object stored in the learned design VR object database 210 is provided using the VR object simulation system, in some examples, the plurality of previous designs for the object in the learned design VR object database 210 can be referred to as a plurality of baseline designs for the object.

In some examples, the data parser 206 can be configured to communicate with a plurality of VR object simulation systems (e.g., similar to the VR object simulation system 106) to receive respective VR testing data generated during simulation of a corresponding design test of the one or more objects. The data parser 206 can be programmed to parse and store respective parsed VR testing data in the learned design VR database 210. In other examples, the respective VR testing data can be prep-parsed and provided as the respective parsed VR testing data to the learned design VR database 210 for storage therein. Accordingly, the learned design VR database 210 can be used to provide a set of initial object designs for a design request received at the object design system 200.

In some examples, the memory 204 includes a design criteria engine 212. The design criteria engine 212 can be programmed to determine a set of design criteria for a requested object based on design parameter data 214. For example, the user can employ an input device 216 (e.g., a keyboard, a mouse, etc.) of the object design system 200 to communicate with the design criteria engine 212 to provide a request for a design for an object referred to herein as the requested object. The design criteria engine 212 can be programmed to implement a series of questions and answer sessions with the user to determine the set of design criteria for the requested object. In some examples, the design criteria engine 212 can be implemented as a reasoning engine that can be programmed to infer a response (e.g., an answer) or a request (e.g., a question) based on the design parameter data 214 provided base on the user input at the input device 216. The design criteria engine 212 can be programmed to use a best-fit approach to determine the set of design criteria based on the design parameter data 214. Feedback (e.g., answer or response) provided by the user via the input device 216 during each session can be provided as part of the design parameter data 214.

In some examples, the design criteria engine 212 can be programmed to generate a design request (e.g., a question) based on the design parameter data 214. In other examples, the design criteria engine 212 can be programmed to generate a design response (e.g., an answer) based on the design parameter data 214. In an example, the design parameter data 214 including the design request or response can be provided to the design criteria engine 212 to elicit a response from the design criteria engine 212. The design criteria engine 212 can be programmed to formulate a design response or request based on the design parameter data 214. In some examples, the user can employ the input device 216 to provide a design response based on the design request provided by the design criteria engine 212. In some examples, the user can employ the input device 216 to provide a design request based on the design response provided by the design criteria engine 212.

By way of further example, a first design request may include a request for a new filter design, which can be provided as the design parameter data 214, such as based on the user input at the input device 216. For example, the first design request may be a request for a filter design, such as "show me new filter design for an aircraft." In some examples, the design criteria engine 212 can be programmed to formulate a second design request based on the first design request. For example, the second design request may be a question, such as "what type of filter?" The first design response can be rendered on an output device 218 (e.g., a display, or another type of visualization device or system). By way of further example, a first design response can be provided to the design criteria engine 212 as the design parameter data 214, such as based on the user input at the input device 216. The first design response can be an answer to the second design request, such as "a fuel filter for a first engine of the vehicle."

In further examples, the design criteria engine 212 can be programmed to formulate a third design request based on the design parameter data 214 that includes the first design response. The third design request can be a question based on the first design response, such as "where would you like to place the fuel filter?" By way of further example, a second design response can be provided to the design criteria engine 212 as the design parameter data 214, such as based on the user input at the input device 216. The second design response can be an answer to the third design request, such as "in the first engine bay fire zone of the vehicle." In some examples, the design criteria engine 212 can be programmed to formulate a fourth design request based on the design parameter data 214. The fourth design request can be a question, such as "whether the fuel filter is to be disposable or cleanable?"

Accordingly, the design criteria engine 212 can be programmed to implement a series of question and answer sessions to determine the set of design criteria for the requested object. By employing a series question-answer approach, the design criteria engine 212 can improve an understanding of design parameters and/or constraints for the requested object. The design criteria engine 212 can be programmed to implement the series of question and answer sessions until the design criteria engine 212 has sufficient information to generate the set of design criteria for the requested object, such that the object design system 200 can determine the optimized design for the requested object.

In some examples, the memory 204 includes a design engine 220. The design criteria engine 212 and the design engine 220 can define or form an object designer 222. The object designer 222 can be similar to the object designer 112, as shown in FIG. 1. The design engine 220 can be programmed to identify a set of candidate designs for the requested object based on the set of design criteria for the requested object using the learned design VR database 210. In some examples, the set of candidate designs identified by the design engine 220 can be the set of candidate designs 114, as shown in FIG. 1. In some examples, the set of candidate designs for the requested object includes a single candidate design, in other examples, the set of candidate designs include two or more candidate designs. The design engine 220 can be implemented as a candidate design search engine that can be programmed to search the learned design VR database 210 to identify the set of candidate designs for the requested object based on the set of design criteria.

In some examples, the memory 204 includes a design simulator engine 224. The design simulator engine 224 can correspond to the design simulator engine 120, as shown in FIG. 1. The design simulator engine 224 can be programmed to simulate each of the candidate designs in a simulation environment based on a learned design simulation database 226 and optimization criteria 228. In some examples, the learned design simulation database 226 can be the learned design simulation database 122, and the optimization criteria 228 can be optimization criteria 124, as shown in FIG. 1. The optimization criteria 228 can be provided at the input device 216 by the user. In some examples, the optimization criteria 228 can be provided as part of the design parameter data 214. The optimization criteria 228 can identify one or more object use conditions for the requested object. As an example, the one or more object use conditions can include an object access condition (e.g., how easily the requested object can or should be accessed during maintenance of the requested object), a repair time condition (e.g., how long maintenance of the requested object should take), a tool condition (e.g., a number and type of tools for implementing maintenance on the requested object, or installation of the requested object), and other types of object use conditions.

The optimization criteria 228 can be used to drive the design simulator engine 224 to improve at least some of the candidate designs. For example, the design simulator engine 224 can be programmed to construct candidate objects based on a respective one of the candidate designs and simulate the constructed candidate objects to identify design improvements. The design simulator engine 224 can be programmed to simulate the vehicle in the simulation environment and simulate scenarios of candidate object use as described herein to determine or identify design improvements based on the optimization criteria 228. For example, if the optimization criteria 228 specifies the object access condition the design simulator engine 224 can be programmed to simulate scenarios that identify a new location for the candidate object that increases object access (e.g., and thus reducing maintenance time by making the object easier to be located or reached). Thus, the optimization criteria 228 can be used to influence or drive design changes made by the design simulator engine 224 to each candidate design during candidate object design simulation. As such, the optimization criteria 228 can be used to influence one or more design changes for at least some of the candidate designs of the set of candidate designs for the requested object during the simulation to identify the at least one new design for the requested object.

The learned design simulation database 226 can characterize one or more previously simulated scenarios (e.g., a previously simulated maintenance scenario) used for simulating one or more previously simulated designs, the one or more previously simulated designs, and associated design changes for the one or more previously simulated designs for the requested object. In some examples, each design change identified in the learned design simulation database 226 can be associated with a respective previous candidate design and, in some examples, can be associated with respective previous optimization criteria.

In some examples, the design simulator engine 224 can be implemented as an artificial intelligence (AI) engine that can be programmed to simulate scenarios in the simulation environment that include a respective candidate design corresponding to a respective constructed candidate object. As an example, the simulated scenarios can include installation scenarios (e.g., simulations of a user installing the requested object on the vehicle based on the respective candidate design), maintenance scenarios (e.g., simulations of a user carrying out maintenance on the requested object based on the respective candidate design), and object use scenarios (e.g., simulations of the requested object based on the respective candidate design being used in a respective system of the vehicle). The design simulator engine 224 can be programmed to implement design changes to the respective candidate design for scenario simulation in the simulation environment that satisfies the optimization criteria 228.

Each design change made to each respective candidate design (e.g., the respective constructed candidate object) can be simulated in a simulation environment by the design simulator engine 224 to determine an impact that a respective design change has on the simulation environment, simulated objects in the simulation environment, maintenance of the requested object based on the respective candidate design, repair of the requested object based on the respective candidate design. The design simulator engine 224 can be programmed to determine a respective design change for the respective constructed candidate object based on the optimization criteria 228. For example, the design simulator engine 224 can be programmed to simulate a scenario in which the respective constructed candidate object based on the respective candidate design for the requested object is positioned at a location on the virtual vehicle that provides more efficient access and thus reduces maintenance and/or repair time.

The design simulator engine 224 can be programmed to simulate maintenance of the respective constructed candidate object at the location on the virtual vehicle to determine how effectively (e.g., how quickly) the candidate object based on the respective candidate design can be repaired or replaced. In some examples, the design simulator engine 224 can be programmed to identify design constraints for the respective candidate design based on the simulation scenarios. In some examples, the design simulator engine 224 can be programmed to compute timing information (e.g., an amount of time needed to repair or install the requested object based on the respective design) for each respective constructed candidate object.

The design simulator engine 224 can be programmed to identify new designs for the requested object and associated design attributes. For example, the design simulator engine 224 can be programmed to determine a new design for the requested object identifying a new location at which the requested object is to be on the aerial vehicle. Each new design for the requested object and associated design attributes can be stored as part of the learned design simulation database 226. Because the new designs and associated design attributes identified by the design simulator engine 224 are stored as part of the learned design simulation database 226, the new designs stored therein can be referred to as simulated identified designs for the requested object.

In some examples, the design simulator engine 224 can include a ranking module 230. In other examples, the ranking module 230 can be external of the design simulator engine 224. The ranking module 230 can be programmed to rank (or order) the set of candidate designs and/or the at least one new design for the requested object based on ranking criteria 232. In some examples, the ranking criteria 232 can be provided by the user based on the user input at the input device 216. In some examples, the ranking criteria 232 can be provided during the question and answer sessions with the user. In further examples, the ranking criteria 232 can be provided as part of the design parameter data 214. The ranking criteria 232 can specify an importance of a design factor for the requested object. For example, the design factor can indicate that object access is most important to the user. In other examples, the design factor can indicate that maintenance time is most important to the user.

The ranking module 230 can be programmed to provide a ranked design list 234 based on the ranking criteria 232. In some examples, the ranked design list 234 can be similar to the ranked design list 126, as shown in FIG. 1. In some examples, a select design for the requested object of the ranked design list 234 can have a greatest ranking indicating the select design as the optimized design. The ranked design list 234 can be provided to the output device 218 for displaying thereon (e.g., to the user).

In some examples, one or more ranked designs of the ranked design list 234 for the requested object can be selected. The one or more ranked designs for the requested object can be selected based on user input at the input device 216, or in other examples, ranked design selection data (e.g., indicating that a subset of respective ranked designs for the requested object is to be selected, such as a select number of ranked design from the ranked design list 234). In some examples, the memory 204 can include a design rendering engine 236. The design rendering engine 236 can be programmed to transform each of the one or more ranked designs for the requested object for use in the VR object simulation system. Thus, the design rendering engine 236 can be programmed to export each of the one or more ranked designs for the requested object to the VR object simulation system.

In some examples, the design rendering engine 236 can be programmed to export each of the one or more ranked designs for the requested object in a data format that is compatible with the VR object simulation system. The VR object simulation system 106 can be configured to enable the user to simulate the use of the requested object according to a respective ranked design from the ranked design list 234 and thus evaluate (e.g., test) and reinforce each respective selected ranked design. Thus, the object design system 200 can allow for real-time human interaction with the exported ranked designs to implement one of repair, maintenance, replacement, or use of the requested object based on the one or more ranked designs for the requested object in a simulated virtual environment rendered by the VR object simulation system. In some examples, the design rendering engine 236 can include graphical rendering tools (e.g., 3-D graphical rendering tools) that can be programmed to provide a graphical representation of at least one ranked design for the requested object of the ranked design list 234. Each graphical representation can be provided to the output device 218 to enable the user to visualize the requested design constructed by the design rendering engine 236 based on a respective selected ranked design of the ranked design list 234.

In some examples, the user can employ the input device 216 to provide design selection reasoning data 238. For example, the user can simulate each of the one or more ranked designs from the ranked design list 234 in the VR reality simulation system and identify a given design for the object. The user can provide the design selection reasoning data 238 for the given object. The design selection reasoning data 238 can identify the given design for the requested object corresponding to one of the ranked designs in the ranked design list 234 and can include information indicating why a given ranked design from the ranked design list 234 for the requested object was selected. The design selection reasoning data 238 can be provided to the learned design VR database 210 and stored therein. By providing the design selection reasoning data 238 back to the learned design VR database 210 for each given design for the object, the design engine 220 can be improved over time in identifying designs for subsequently requested objects that more closely satisfy the design parameter data 214.

Accordingly, the object design system 200 herein can be programmed to provide the optimized design for the requested object that is based on prior learned object designs (e.g., stored in the learned design VR database 210) that meets design objectives provided by the user (e.g., as part of the design parameter data 214). The optimized design for the requested object provided by the object design system 200 can reduce maintenance time and thus downtime (e.g., of a vehicle) in contrast to a legacy design for the requested object being used. The object design system 200 can be programmed to take into account at least one design constraint of at least one previous design for the requested object to provide the optimized design for the requested object corresponding to a design that is free of the at least one design constraint.

Figure 3:
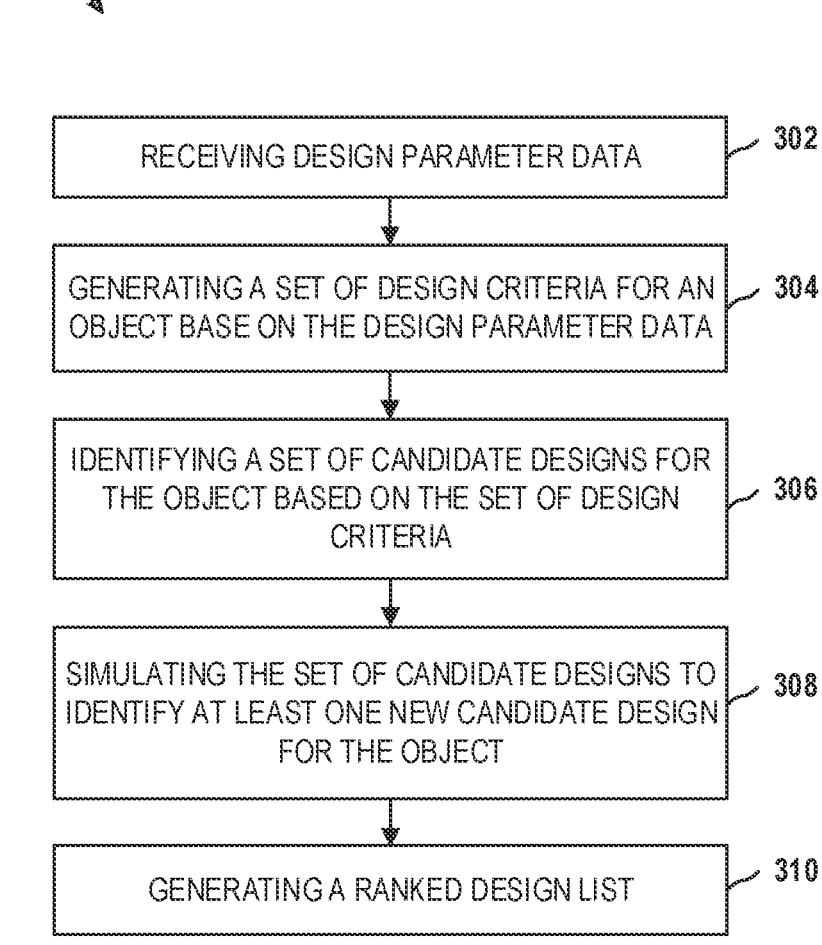
FIG. 3 is an example of a method for determining a design for an object.

In view of the foregoing structural and functional features described above, example methods will be better appreciated with references to FIGS. 3-4. While, for purposes of simplicity of explanation, the example methods of FIGS. 3-4 are shown and described as executing serially, it is to be understood and appreciated that the example method is not limited by the illustrated order, as some actions could in other examples occur in different orders, multiple times and/or concurrently from that shown and described herein.

FIG. 3 is an example of a method 300 for determining a design for an object. The method 300 can be implemented by the object design system 104, as shown in FIG. 1, or the object design system 200, as shown in FIG. 2. Therefore, reference to the example of FIGS. 1-2 can be made in the example of FIG. 3. The method 300 can begin at 302 by receiving (e.g., at an object designer 112, as shown in FIG. 1) design parameter data (e.g., the design parameter data 116, as shown in FIG. 1) for an object (e.g., the object 102, as shown in FIG. 1) based on user input at an input device (e.g., the input device 216, as shown in FIG. 2). At 304, generating a set of design criteria for the object based on the design parameter data. At 306, searching a learned design VR database (e.g., the learned design VR database 118, as shown in FIG. 1) to identify a set of candidate designs (e.g., the candidate designs 114, as shown in FIG. 1) for the object based on the set of design criteria.

At 308, simulating (e.g., using the design simulator engine 120, as shown in FIG. 1) each candidate design for the object in a simulation environment based on a learned design simulation database (e.g., the learned design simulation database 122, as shown in FIG. 1) and optimization criteria (e.g., the optimization criteria 124, as shown in FIG. 1) to identify at least one new design for the object. At 310, generating (e.g., via the ranking module 230, as shown in FIG. 2) a ranked design list (e.g., the ranked design list 126, as shown in FIG. 1) ranking each candidate design and the at least one new design for the object.

FIG. 4 is another example of a method 400 for determining a design for an object. The method 400 can be implemented by the object design system 104, as shown in FIG. 1, or the object design system 200, as shown in FIG. 2. Therefore, reference to the example of FIGS. 1-2 can be made in the example of FIG. 4. The method 400 can begin at 402 by determining a set of candidate designs (e.g., the candidate designs 114, as shown in FIG. 1) for an object (e.g., the object 102, as shown in FIG. 1) based on design parameter data (e.g., the design parameter data 116, as shown in FIG. 1) generated based on user input at an input device (e.g., the input device 216, as shown in FIG. 2) and a learned design VR database (e.g., the learned design VR database 118, as shown in FIG. 1). At 404, simulating (e.g., using the design simulator engine 120, as shown in FIG. 1) each candidate design for the object in a simulation environment based on a learned design simulation database (e.g., the learned design simulation database 122, as shown in FIG. 1) and optimization criteria (e.g., the optimization criteria 124, as shown in FIG. 1). At 406, ranking each candidate design and the at least one new design for the object based on ranking criteria (e.g., the ranking criteria 232, as shown in FIG. 2) to provide a ranked design list. At 408, identifying the at least one new design in the ranked design list as an optimized design for the object based on an evaluation of the ranked design list. In some examples, the evaluation can include evaluating the ranked design list to identify a greatest ranked design among the ranked designs of the ranked design list as the optimized design.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:
1. A computer-implemented method comprising:
receiving design parameter data for an object based on user input at an input device;
generating a set of design criteria for the object based on the design parameter data;
searching a learned design virtual reality (VR) database to identify a set of candidate designs for the object based on the set of design criteria, wherein each candidate design of the set of candidate designs includes user timing and motion data characterizing user interaction for maintenance of a virtual representation of a corresponding candidate design in a virtual environment provided by a VR object simulation system;
simulating each candidate design for the object in a simulation environment based on a learned design simulation database and optimization criteria to identify at least one new design for the object;
generating a ranked design list ranking each candidate design and the at least one new design for the object based on the simulating, such that a given design of the set of candidate designs or the at least one new design with a greatest ranking has a shortest maintenance time; and
displaying, on an output device, at least one candidate ranked design in the ranked design list with a graphical representation showing the object positioned within a virtual vehicle environment.

2. The computer-implemented method of claim 1, wherein the learned design simulation database characterizes one or more previously simulated scenarios and associated design changes for one or more previously simulated designs for the object, the optimization criteria being used to influence one or more design changes for at least some of the candidate designs of the set of candidate designs for the object during the simulation to identify the at least one new design for the object.

3. The computer-implemented method of claim 2, wherein receiving the design parameter data for the object comprises:

generating a design request based on the user input for design specification information for the object; and receiving a design response in response to the design request based on the user input at the input device, the design parameter data comprising the design response.

4. The computer-implemented method of claim 3, wherein each previously determined design for the object comprises design attributes, the design attributes comprising at least one design constraint for a respective previously determined design, and at least one design preference for the respective previously determined design.

5. The computer-implemented method of claim 4, wherein the previously determined designs for the object stored in the learned design simulation database are determined based on virtual reality (VR) testing data provided by the VR object simulation system for simulating object designs.

6. The computer-implemented method of claim 5, wherein the VR object simulation system is configured to determine candidate designs for the object based on captured motions of a user relative to a graphical representation of the object in a virtual environment, the captured motions simulating maintenance of the object in the virtual environment.

7. The computer-implemented method of claim 1, the computer-implemented method further comprising:

updating the learned design database to include design preference for the given design.

8. A system comprising:

memory comprising machine readable instructions and data; and one or more processors to access the memory and execute the machine readable instructions, the machine readable instructions comprising:

an object designer programmed to determine a set of candidate designs for an object based on design parameter data and a learned design virtual reality (VR) database, the learned design VR database comprising a plurality of previously determined designs for the object, wherein each candidate design of the set of candidate designs includes user timing and motion data characterizing user interaction for maintenance of a virtual representation of a corresponding candidate design in a virtual environment provided by a VR object simulation system; and a design simulator engine programmed to:

simulate each candidate design for the object in a simulation environment based on a learned design simulation database and optimization criteria, the learned design simulation database characterizing one or more previously simulated scenarios and associated design changes for one or more previously simulated designs for the object, the optimization criteria being used to influence one or more design changes for at least some of the candidate designs of the set of candidate designs for the object during the simulation to identify at least one new design for the object;

generate a ranked design list ranking each candidate design and the at least one new design for the object based on the simulating, such that a given design of the set of candidate designs or the at least one new design with a greatest ranking has a shortest maintenance time; and display, on an output device, at least one candidate ranked design in the ranked design list with a graphical representation showing the object positioned within a virtual vehicle environment.

9. The system of claim 8, wherein the design simulator engine comprises a ranking module programmed to generate the ranked design list identifying the at least one new design as having a greatest ranking relative to the set of candidate designs in the ranked design list.

10. The system of claim 9, wherein the one or more previously simulated scenarios are one or more previously simulated maintenance scenarios for the object, and the design simulator engine is programmed to simulate each candidate design for the object in one or more maintenance scenarios in the simulation environment.

11. The system of claim 10, wherein the object designer comprises a design criteria engine programmed to generate a set of design criteria based on the design parameter data for the object, the design parameter data being provided based on a user input at an input device, the design criteria engine being programmed to generate a design request and receive a design response in response to the design request based on the user input at the input device, the design parameter data comprising the design response, the set of candidate designs for the object being determined based on the set of design criteria.

12. The system of claim 11, wherein the object designer comprises a design engine programmed to search the learned design VR database to identify the set of candidate designs for the object based on the design parameter data.

13. The system of claim 12, wherein each previously determined design for the object comprises design attributes, the design attributes comprising at least one design constraint for a respective previously determined design, and at least one design preference for the respective previously determined design.

14. The system of claim 13, wherein the previously determined designs for the object stored in the learned design virtual reality database are determined based on VR testing data provided by the VR object simulation system for simulating object designs, the VR object simulation system being configured to determine the previously determined designs for the object based on capture motions of a user relative to a graphical representation of the object in a virtual environment, the captured motions simulating maintenance of the object in the virtual environment.

15. The system of claim 14, wherein a given design for the object from the ranked design list is identified as optimized design for the object based on the user input at the device, the input device being configured to receive design selection data for the optimized design, the design selection data comprising a design preference indicative of a selection reasoning for the given design for the object as the optimized design for the object, and the learned design VR database is updated to include the design preference for the optimized design based on the design selection data.

16. One or more non-transitory computer-readable media having data and machine readable instructions executable by a processor, the data comprising a learned design virtual reality (VR) database comprising a plurality of previously determined designs for an object, a learned design simulation database characterizes one or more previously simulated scenarios and associated design changes for one or more previously simulated designs for the object, and design parameter data for the object, the machine readable instructions comprising:

an object designer programmed to determine a set of candidate designs for the object based on the design parameter data and the learned design VR database, wherein each candidate design of the set of candidate designs includes user timing and motion data characterizing user interaction for maintenance of a virtual representation of a corresponding candidate design in a virtual environment provided by a VR object simulation system;

a design simulator engine programmed to simulate each candidate design for the object in a simulation environment based on the learned design simulation database and optimization criteria to identify at least one new design for the object;

a ranking module programmed to generate a ranked design list ranking each candidate design and the at least one new design for the object based on the simulating, such that a given design of the set of candidate designs or the at least one new design with a greatest ranking has a shortest maintenance time; and the design simulator engine being further programmed to:
display, on an output device, at least one candidate ranked design in the ranked design list with a graphical representation showing the object positioned within a virtual vehicle environment.

17. The one or more non-transitory computer-readable media of claim 16, wherein the data further comprise the optimization criteria, the optimization criteria being used to influence one or more design changes for at least some of the candidate designs of the set of candidate designs for the object during the simulation to identify the at least one new design for the object.

18. The one or more non-transitory computer-readable media of claim 17, wherein the previously determined designs for the object stored in the learned design VR database are determined based on VR testing data provided by the VR object simulation system for simulating maintenance of object designs, the VR object simulation system being configured to determine the previously determined designs for the object based on captured motions of a user relative to a graphical representation of the object in a virtual environment, the captured motions simulating maintenance of the object in the virtual environment.

* * * * *